United States Patent [19]
Marouby et al.

[11] 3,977,733
[45] Aug. 31, 1976

[54] ANTISKID BRAKING SYSTEM

[75] Inventors: Guy Marouby, Neuilly; Christian Tanguy, Frepillon Val D'Oise, both of France

[73] Assignee: Societe Anonyme D.B.A., Paris, France

[22] Filed: Jan. 18, 1973

[21] Appl. No.: 324,728

[30] Foreign Application Priority Data
Jan. 25, 1972 France .............................. 72.02302

[52] U.S. Cl. ........................ 303/21 BE; 188/181 C
[51] Int. Cl.² ......................................... B60T 8/10
[58] Field of Search............. 188/181 C; 303/20, 21; 307/109, 235 R, 235 A, 246; 317/5; 320/1; 324/161; 328/115, 116, 151; 340/52 B, 53, 263; 180/82 R

[56] References Cited
UNITED STATES PATENTS

| | | | |
|---|---|---|---|
| 2,874,810 | 2/1959 | Brown............................ | 188/181 A |
| 3,328,705 | 6/1967 | Eubanks ........................ | 328/151 |
| 3,604,760 | 9/1971 | Atkins............................ | 303/21 CG |
| 3,606,491 | 9/1971 | Walsh............................ | 303/21 AF |
| 3,650,575 | 3/1972 | Okamoto ...................... | 188/181 C X |
| 3,652,137 | 3/1972 | Fink et al....................... | 303/21 CG |
| 3,663,070 | 5/1972 | Scharlack ..................... | 303/20 X |

*Primary Examiner*—Stephen G. Kunin
*Attorney, Agent, or Firm*—Ken C. Decker; William N. Antonis

[57] ABSTRACT

In an input control unit for a vehicle anti-skid braking system, a wheel-speed sensor delivers speed signals to the first input of a differential amplifier. Simultaneously, a capacitor is charged through a resistor and a diode. The capacitor is discharged at a constant rate into a device connected to the second input of the differential amplifier. Another diode prevents the voltage across the capacitor from becoming higher than the voltage of the speed signals. The braking pressure is released for the duration of output signals produced by the differential amplifier. The duration of these signals is kept within safe limits due to the fact that the additional diode limits the voltage across the capacitor.

7 Claims, 4 Drawing Figures

ANTISKID BRAKING SYSTEM

SUMMARY OF THE INVENTION

The invention relates to an anti-skid braking system for motor vehicles.

More particularly the invention relates to an anti-skid braking system for a set of wheels, of the type comprising fluid-pressure-operated brake actuating means associated with at least one of the wheels, a sensor for sensing the speed through a resistive network to an electronic circuit which in turn supplies pressure release signals to pressure releasing means, the circuit comprising a storage capacitor charged by the speed signals through one-way conducting means and capable of discharging at constant current into resistance means.

In such a system a differential voltage amplifier whose inputs receive the speed signals and the voltage at the capacitor terminals supplies a signal to release the braking pressure when the speed signals are in a predetermined relationship with respect to the voltage at the capacitor terminals. Also, the capacitor always discharges into the resistance means, its discharge being restricted to a linear discharge at constant current.

Under certain conditions which will be described below, it appears that this type of anti-skid braking system may fail, particularly as regards the driving axle of the vehicle and also in the case of braking on ground offering poor or variable adhesion.

For example, the wheels associated with a driving axle may spin, particularly if the adhesion to the ground is poor and if the vehicle's engine is accelerated abruptly. The speed at which the wheels spin may be much greater than the speed of the vehicle at this time, so that the capacitor is charged to a relatively very high value. When the driver of the vehicle becomes aware that the driving wheels are spinning and relaxes the effort applied on the accelerator, the linear speed of the driving wheel or wheels drops until it corresponds to the speed of the vehicle at the time. However, the voltage stored in the capacitor can only be discharged into the resistance means at constant current, over a period which may be relatively long. This discharge may for example last several seconds, during which the amplifier is supplying a pressure release signal, so that the wheel or wheels which were spinning are temporarily without braking capacity.

Another disadvantage of a braking system of the type described appears during braking on ground offering poor or variable adhesion. Under these circumstances the wheels may be very likely to lock, in which case the speed loops experienced by each wheel in a brake application are very pronounced. During one of these speed loops, therefore, the speed signal of the wheel may drop considerably below the voltage at the storage capacitor terminals, and the duration of the pressure release signal may therefore be excessively long. In this case there is an unnecessary drop in the braking pressure and an inadmissible loss of braking-system efficiency in respect of the stopping distances.

To overcome these disadvantages the present invention proposes an anit-skid braking system of the type described, characterized in that the electronic circuit comprises protecting means for preventing the voltage at the terminals of the capacitor from exceeding the voltage of the speed signals plus a given quantity.

This is preferably carried out by discharging the capacitor into the resistive network and conductive in this direction, the given quantity being equal in this case to the direct voltage drop in the diode or diodes.

BRIEF DESCRIPTION OF THE DRAWINGS

The invention will be now be described by way of example, with reference to the accompanying drawings in which.

DETAILED DESCRIPTION OF A PREFERRED EMBODIMENT

Figure 1:
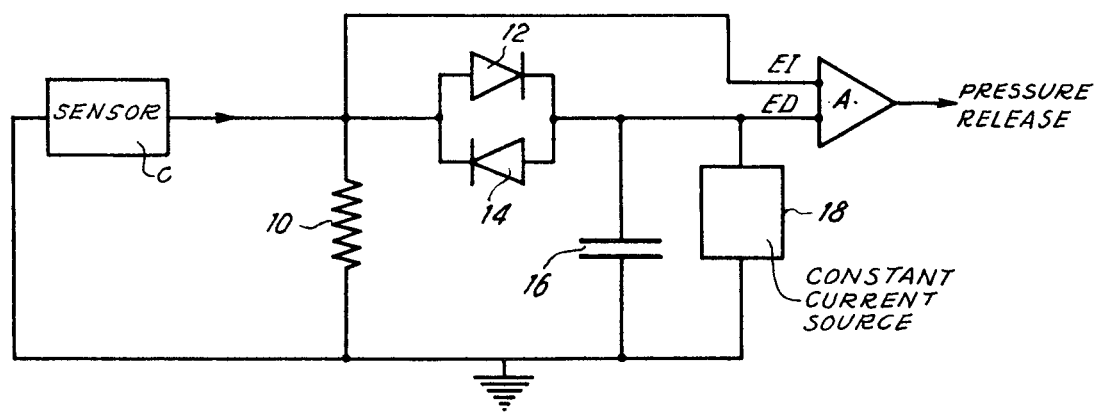
FIG. 1 is a diagrammatic view of part of an anti-skid braking circuit embodying the invention and associated with at least one wheel of a vehicle.

FIG. 1 shows a conventional sensor C producing across a resistance 10 a voltage representative the speed of one wheel (not shown) of a vehicle (not shown). The resistance 10 is connected by means of two diodes 12, 14 arranged head-to-tail to a capacitor 16, arranged in parallel with a conventional device 18 producing a constant current discharge. Lastly, a differential amplifier A is connected to the resistance 10 by its inverting input terminal EI and to the capacitor 16 by its non-inverting input terminal ED. The output signal from the differential amplifier A is used by braking modulation means for releasing the braking pressure applied to a brake (not shown) belonging to the wheel associated with the sensor C.

The circuit shown in FIG. 1 operates as follows.

The sensor C supplies the resistance 10 with a voltage proportional to the speed of the vehicle wheel. This voltage at the terminals of the resistance 10 charges the capacitor 16 by way of the diode 12. The capacitor simultaneously discharges into the constant discharge-current device 18, and as long as the voltage delivered by the sensor C is increasing or constant, the voltage across the capacitor 16 equals the voltage at the terminals of the resistance 10 less the direct voltage drop across the diode 12, this drop being approximately 0.5 volts. If the wheel-speed signal supplied by the sensor C is decreasing, the voltage at the terminals of the capacitor 16 also decreases, because the capacitor is discharging into the device 18. As long as the rate of decrease of the output voltage from the sensor C is less than the maximum decrease rate assigned to the voltage across the capacitor 16 by the constant-current device 18, the difference between the voltages across the capacitor 16 and the resistance 10 is always 0.5 volts (the voltage drop in the diode 12). On the other hand, if the output voltage from the sensor C decreases faster than the voltage across the capacitor 16 is allowed to decrease by constant-current discharge into the device 18, the difference between the voltages across the capacitor and the resistance 10 becomes less than 0.5 volts and eventually disappears. At this instant the differential amplifier A supplies an output signal, which acts as a pressure release signal, and which continues as long as the voltage across the capacitor 16 remains greater than the voltage across the resistance 10. As a result of this release signal from the differential amplifier A the braking pressure exerted on the wheel is reduced, causing the wheel to accelerate again, with the result that the output voltage from the sensor C increases again, the release signal from the differential amplifier A therefore disappears, and a new anti-skid braking cycle can take place. Throughout this operation the diode 14 remains ineffective.

Figure 2:
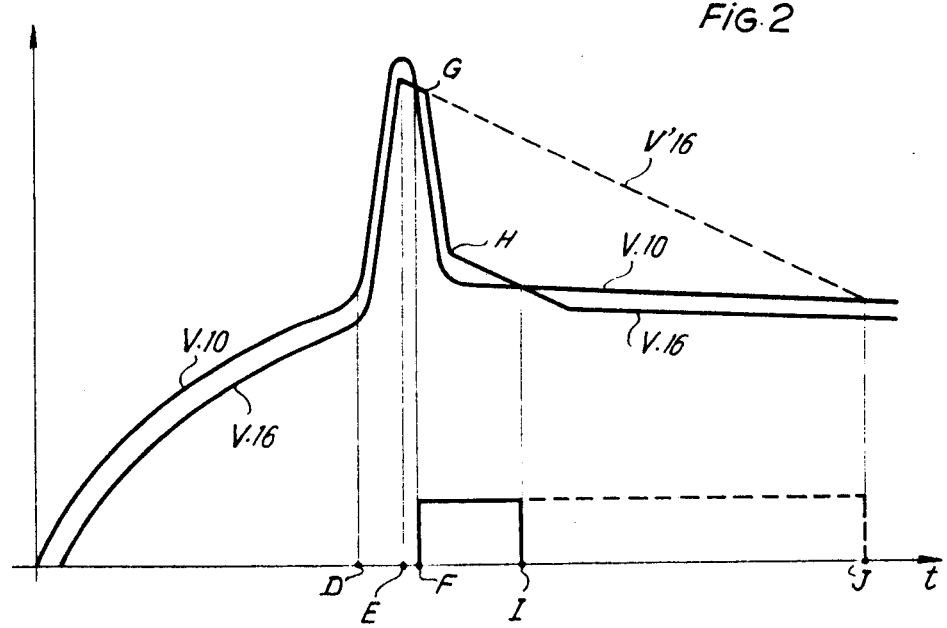
FIG. 2 illustrates variations in electrical quantities relating to components shown in FIG. 1, when the wheel spins during acceleration.

If, however, the wheel associated with the sensor C is a driving wheel of the vehicle and this wheel spins as a result of particular conditions, for example ground with poor adhesion and excessive acceleration by the driver, the speed of the wheel may vary as shown in FIG. 2, in which the reference V 10 represents the voltage across the resistance 10 when the device shown in FIG. 1 operates due to spin during acceleration, and reference V 16 represents the voltage across the capacitor 16 when the device so operates. As FIG. 2 shows, no spin occurs until a certain instant D, but between the instant D and an instant E there is increasing spin of the wheel relative to the ground. Assuming that at the instant E the driver of the vehicle becomes aware of the wheel-spin and relieves the effort on the accelerator pedal, the speed of this wheel drops rapidly, until it corresponds to non-slip relative motion of the wheel and ground. During this process the voltage V16 across the capacitor 16 is, until the instant E, constantly less than the voltage V10 by 0.5 volts (the voltage drop in the diode 12). From the instant E, however, the voltage V 10 begins to drop very rapidly, and the voltage V 16 across the capacitor drops at a rate imposed by the constant discharge-current device 18. In the absence of the diode 14 this voltage V16 would decrease in linear fashion until an instant J at which the voltage across the capacitor again equals the voltage across the resistance 10. This operation in the absence of the diode 14 is indicated by a broken line in FIG. 2 and designated V′ 16. In the absence of the diode 14, also, the differential amplifier A would supply a signal to release the braking pressure between the instants F and J, since during this interval the voltage V′16 is greater than the voltage V 10. This amounts to saying that the wheel concerned would be without braking throughout the interval F.J. To overcome this disadvantage, in accordance with the invention, the diode 14 is connected in parallel with the diode 12 but is conductive in the opposite direction, with the result that, from a point G at which the voltage at the capacitor terminals equals the voltage at the terminals of the resistance 10 plus the direct voltage drop in the diode 14, the capacitor 16 can discharge freely into the resistance 10 through this diode 14, and does so until a point H. The rate of discharge can, by selecting a suitable resistance 10, be set high enough to suitably reduce the decrease in the voltage across the capacitor relative to the decrease in the wheel speed. From the point H the difference between the voltages across the capacitor 16 and the resistance 10 again equals the direct voltage drop in the diode 14, and the capacitor 16 therefore resumes discharging at constant current into the device 18. This being so, the voltage V 10 and voltage V 16 become equal at an instant I, and the differential amplifier A therefore ceases to supply the pressure release signal which appeared at the instant F. In the invention, therefore, the signal to release the braking pressure in the event of spinning of a driving wheel of the vehicle is much shorter than that which would appear in the absence of the diode 14.

According to a feature of the invention, this diode 14 may be replaced with any one-way conducting device with a given direct voltage drop, for example a plurality of diodes arranged in series, so as to adjust the direct voltage drop to the particular case and so regulate the duration of the interval F.I as desired. Also, according to a further feature of the invention, the resistance 10, or the resistance equivalent to the entire wheel-speed sensor circuit as seen from the capacitor terminals, may be made much lower than the equivalent resistance of the constant discharge-current device 18, in order to make the voltage across the capacitor decrease rapidly from the instant G.

Figure 3:
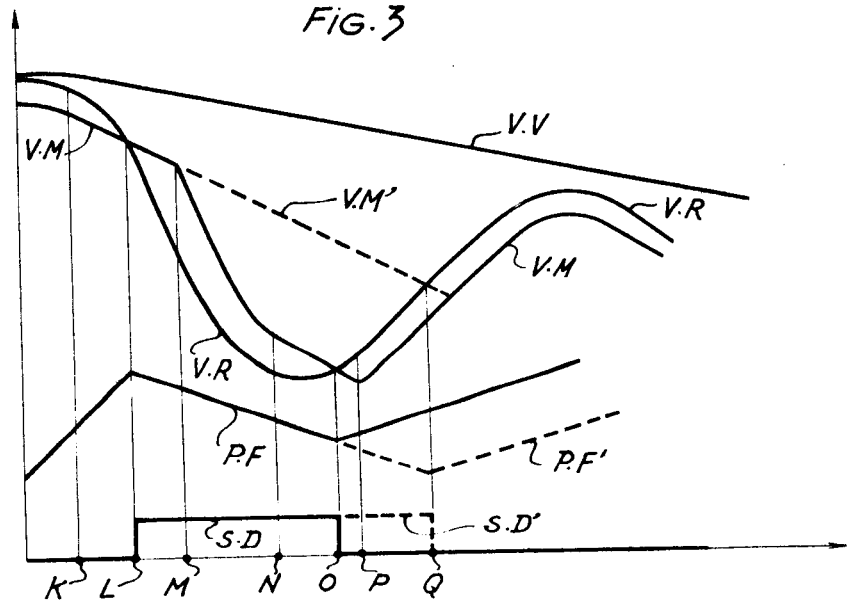
FIG. 3 illustrates variations in electrical quantities relating to components shown in FIG. 1, during an anti-skid brake application.

FIG. 3 illustrates operation of a system embodying the invention if a wheel-skid is due to excessively hard braking on ground offering poor or variable adhesion. FIG. 3 plots against time a curve V.V representing the variations in the vehicle speed, a curve V.R. representing the variations in the speed of the wheel concerned, that is, in the output voltage from the sensor C, curves V.M and V.M′ representing the variations in the voltage at the terminals of the storage capacitor 16, curves P.F. and P.F′ representing the variations in the braking pressure exerted on the wheel, and curves S.D. and S.D′ representing variations in the pressure release signal supplied by the amplifier A.

As FIG. 3 shows, at an instant K following excessively hard braking by the driver the voltage V.R representing the wheel speed begins to decrease faster than the voltage V.M can decrease. The voltage V.M, than, decreases linearly from this instant K, and at the instant L it equals the voltage V.R, so that the release signal S.D is generated and the braking pressure P.F decreases. At an instant M the difference between the voltages V.R and V.M equals the direct voltage drop in the diode 14 (or in the diodes 14), and the capacitor 16 discharges preferentially through the resistance 10, until an instant N at which this difference again becomes less than the direct voltage drop, and from which the voltage V.M. decreases linearly until an instant P. Meanwhile at an instant O, the voltages V.M and V.R become equal and the signal S.D disappears, so that the pressure P.F rises again. From the instant P the voltage V.M remains less than the voltage V.R by the direct voltage drop in the diode 12, and the anti-skid cycle can be repeated.

For comparison the variations V.M′, P.F′ and S.D′ which would occur in the quantities V.m, P.F and S.D respectively if the diode 14 were not inserted in the circuit show in FIG. 1 are shown with broken lines. In this case the voltage V.M′ decreases linearly from the instant K to the instant Q, the release signal S.D′ is therefore generated throughout the interval L-Q, and the braking pressure P.F′ is considerably less than the pressure P.F. This exaggerated reduction in the braking pressure is detrimental to the efficiency of an anti-skid braking system, and the insertion of the diode 14 prevents such an untimely extension of the period during which the pressure P.F. is released.

Figure 4:
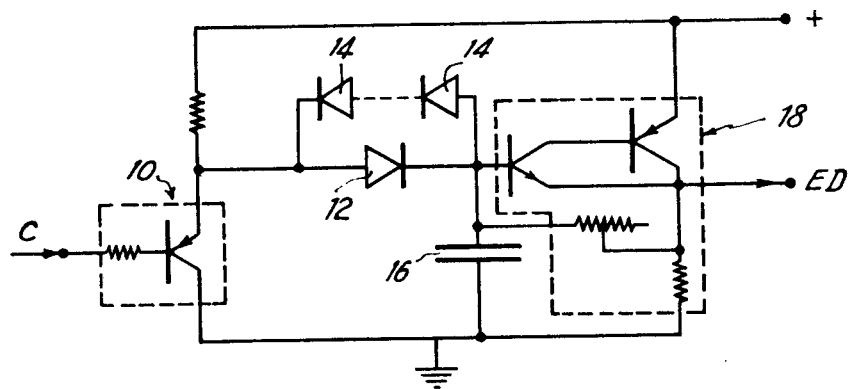
FIG. 4 illustrates a particular embodiment of the circuit shown in FIG. 1.

Lastly, FIG. 4 illustrates a typical embodiment of the circuit shown in FIG. 1, equivalent elements bearing identical reference numerals. It will be noted that a matching stage with a transistor is substituted for the resistance 10, a plurality of diodes arranged in series are substituted for the diode 14, and the constant-current device 18 is formed by an assembly of two transistors and two resistances, one resistance being adjustable in a conventional manner. The circuit shown in FIG. 4 operates exactly the same as the more diagrammatic circuit shown in FIG. 1 and therefore does not require any additional explanation.

I claim:

1. In a wheeled vehicle having a brake controlling one of said wheels, an adaptive braking system for controlling said brake comprising:
   means for generating a first signal proportional to the rotational velocity of said wheel,
   means for generating a second signal having a value proportionally less than that of said first signal prior to a brake application, said second signal generating means including means to limit the decrease of said second signal to a predetermined maximum rate regardless of the rate of decrease of said first signal during a brake application, whereby the value of said first signal initially becomes equal to the value of said second signal if the first signal decreases in excess of said predetermined maximum rate,
   means for effecting a brake pressure reduction when the value of said first signal initially becomes equal to the value of said second signal,
   said second signal generating means further including means permitting the value of said second signal to decrease in proportion to the subsequent decrease in the value of said first signal after the value of the latter drops below the value of said second signal by a predetermined amount, said means limiting the decrease of said second signal decreasing the latter at said predetermined rate when the decrease in the value of said first signal terminates so that the difference in said first and second signals becomes less than said predetermined amount whereby the value of said first signal will again become equal to said second signal,
   said means for effecting a brake pressure reduction terminating said reduction when the value of said first signal again becomes equal to said second signal.

2. The invention of claim 1:
   said means limiting the decrease of said second signal to a predetermined maximum rate being effective only until the value of said first signal drops below the value of said second signal by said predetermined amount whereupon said means permitting the value of said second signal to decrease in proportion to the subsequent decrease in the value of said first signal becomes effective.

3. The invention of claim 2:
   said second signal generating means including a capacitor, and a first diode connected between said capacitor and said first signal generating means whereby said capacitor is charged through said diode, said means limiting the decrease in the value of said second signal being a current source connected across said capacitor.

4. The invention of claim 3:
   said means permitting the value of said second signal to decrease in proportion to the subsequent decrease in the value of said first signal being a second diode connected in parallel to said first diode, but opposite in polarity to said first diode.

5. In a wheeled vehicle having a brake controlling one of said wheels, an adaptive braking system for controlling said brake comprising:
   means for generating a speed signal proportional to the rotational velocity of said one wheel;
   a capacitor connected to said last-mentioned means so that the capacitor is charged to a value corresponding to the value of said speed signal when the value of said first signal increases;
   one-way conducting means connected between said capacitor and said generating means permitting charging of the capacitor but preventing discharging of the capacitor through said one-way conducting means;
   a constant current source connected across said capacitor so that said capacitor may discharge linearly through said constant current source;
   protecting means for preventing the value on the capacitor from exceeding the value of said first signal by more than a predetermined amount when the value of said speed signal decreases; and
   means for comparing the value of said first signal with the value stored on said capacitor and initiating a brake pressure reduction when the value of said speed signal drops below the value stored on the capacitor and terminating said brake pressure reduction when the value stored in the capacitor no longer is greater than the value of said speed signal.

6. The invention of claim 5:
   said protecting means including a first diode connected between said generating means and said capacitor, said predetermined amount that the valve on the capacitor is permitting to exceed the value of said speed signal being equal to the drop across said first diode.

7. The invention of claim 6:
   said one-way conducting means being a second diode connected in parallel with said first diode, but of opposite polarity to said first diode.

* * * * *